June 12, 1962 L. B. HORWITZ ETAL 3,038,656
FIELD PLOTTING
Filed Oct. 25, 1954 3 Sheets-Sheet 1
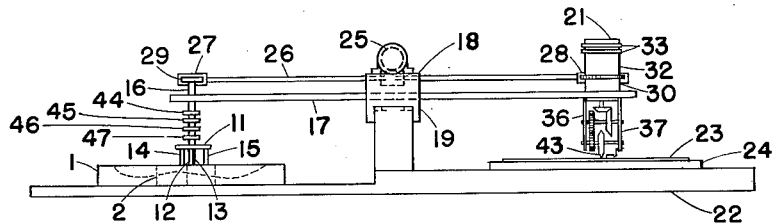
FIG. 1.
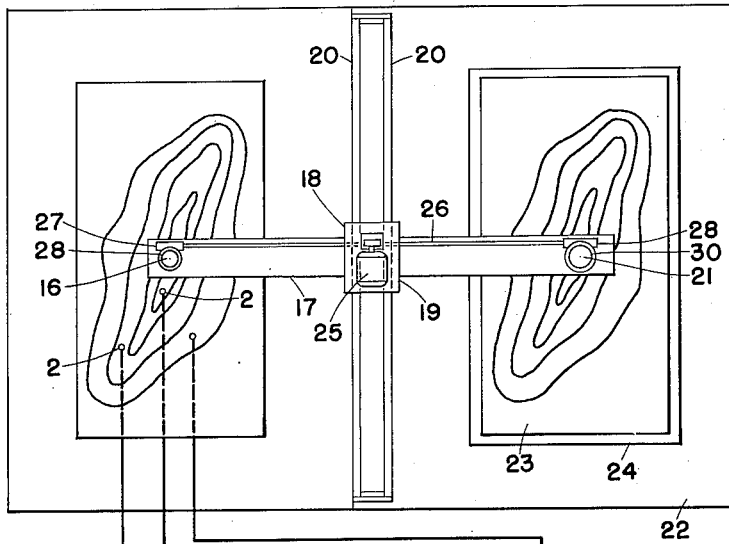
FIG. 2
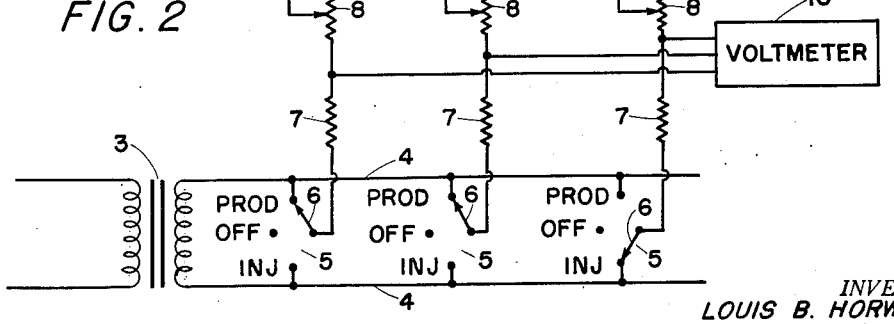
INVENTORS
LOUIS B. HORWITZ
ELMER S. MESSER
BY *Floyd Trimble*
ATTORNEY June 12, 1962  L. B. HORWITZ ETAL  3,038,656
FIELD PLOTTING Filed Oct. 25, 1954  3 Sheets-Sheet 3

INVENTORS,
LOUIS B. HORWITZ
ELMER S. MESSER
BY Floyd Trimble
ATTORNEY

United States Patent Office 3,038,656
Patented June 12, 1962

3,038,656
FIELD PLOTTING
Louis B. Horwitz, Ponca City, and Elmer S. Messer, Tulsa, Okla., assignors to Continental Oil Company, Ponca City, Okla., a corporation of Delaware
Filed Oct. 25, 1954, Ser. No. 464,480
14 Claims. (Cl. 235—61.6)

The present improvements relate to the plotting of data derived from electrical models in which potential fields are established to simulate analogous conditions in various electrical and mechanical systems. More particularly, the invention is concerned with the mapping of information obtained in this manner for the analysis of pressure gradient and flow line systems in underground petroleum reservoirs.

It has been shown by earlier workers in the art that the establishment of electrical currents in a conductive model of such a reservoir proportional to fluid injection and extraction in the latter creates an analogue field in which the direction of electric current flow is the same as that of fluid flow and the potential gradient is proportional to the actual pressure gradient. Furthermore, the transit time of the fluid flow along the system of flow lines in the reservoir will be inversely proportional to the voltage between corresponding points on the analogous electrical current lines. Accordingly, it is possible to obtain potential measurements along the several current flow lines of a model and to express the same in terms of arbitrary time units which can then be used to plot the progress of the invasion fluid, points of similar transit times on the several flow lines, when connected, mapping the invasion fronts.

The models generally used for this type of analysis is in the form of a contoured tank of suitable insulating material, which is geometrically similar in horizontal planes to the actual subterranean reservoir. The tank contains an electrolyte, the depth of the same at any point being proportional to the reservoir depth at the corresponding point corrected by a factor related to permeability. Electrodes are placed throughout the tank at positions corresponding to those of wells operative in the reservoir, and the analogy is completed by establishing the proper potential field in the electrolyte. This is accomplished by passing current through the electrodes in proper relationship to the direction and rate of fluid flow in the wells respectively represented thereby.

Since current flow in the electrolyte is at right angles to equipotential lines therein, a probe mechanism having spaced contacts which seek points of equal potential in the model may be used to position a marking device adapted to mark a chart of the reservoir along a line on such chart having the same relationship thereto that a line at right angles to such contacts has to the model. In other words, the marking device will be caused to plot the current lines of the model, which are analogous to the paths of injection fluid traversing the reservoir. In order to measure voltages along the current flow lines, the probe carries additional contacts, usually two, in a plane normal to that of the equipotential contacts and means for measuring the potential therebetween is included in the apparatus. The voltages represent the transit time increments and since they are individually small, a totalizing device is employed. As indicated, arbitary time units are assigned to such voltages.

The probing and marking mechanisms of this nature provided heretofore are largely manual in operation and require an operator to relocate the probe with the plotting of each successive point on the line being recorded, whether the same be a current flow line or an equipotential line. Means are provided for automatically rotating the probe and the marking device in unison, but this merely locates the proper points on the model relative to the axis of rotation, for example, in plotting a current line the rotation will cause the probe equipotential contacts to seek equal potential points on the model and thus position the flow line contacts. When the system is balanced, a mark is made by manual actuation of the marking device to record a fluid flow line point on the chart, and it is then necessary for the operator to move the rear flow line contact to the point formerly occupied by the advance contact, which has just been recorded, whereupon the probe rotates to find further points of equipotential. Such a probing-plotting assembly therefore must be moved manually in discrete steps.

It is a primary object of our invention to provide plotting mechanism of the character set forth which will automatically propel itself along a flow line or an equipotential line once set initially on the particular such line to be plotted. This improved device, accordingly, requires only that the operator move the probe to transfer from one line to another of the system being surveyed, thus reducing the plotting time and labor considerably.

Another object is to provide a plotting mechanism operative automatically to propel itself along a flow line and to measure transit time in very small increments of distance along such line. The increments are, therefore, numerous and improved accuracy of the plot is obtained.

It is a further object to provide an improved transit time totalizer for use in a system of the character set forth which is electronic in nature and provides rapid and accurate addition of incremental transit times.

Another object is to provide a range switching system responsive to the voltages representative of transit times for automatically selecting the proper range of the recording instruments. This permits the use of extended time scales affording much wider accuracy of readings and relieves the operator of the chore, with possible error, of switching manually from one range to another.

Another object of our invention is to provide a self-propelled marking device which automatically plots its path of movement on the chart with which it is used. Manual marking of each increment of distance is thereby eliminated.

It is also an object to provide such a plotting device including means operable at the discretion of the operator for producing a distinct mark along the line which is automatically plotted. By such means, the operator can record points of desired cumulative transmit time.

Another object is to provide a plotting device of this nature in combination with an electronic transit time totalizer which is triggered at the regular marking intervals of the device to record the transit times corresponding to such intervals.

Other objects and advantages of the invention will appear as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an elevational view of plotting apparatus in accordance with the present invention;

FIG. 2 is a top plan view thereof;

Figure 3:
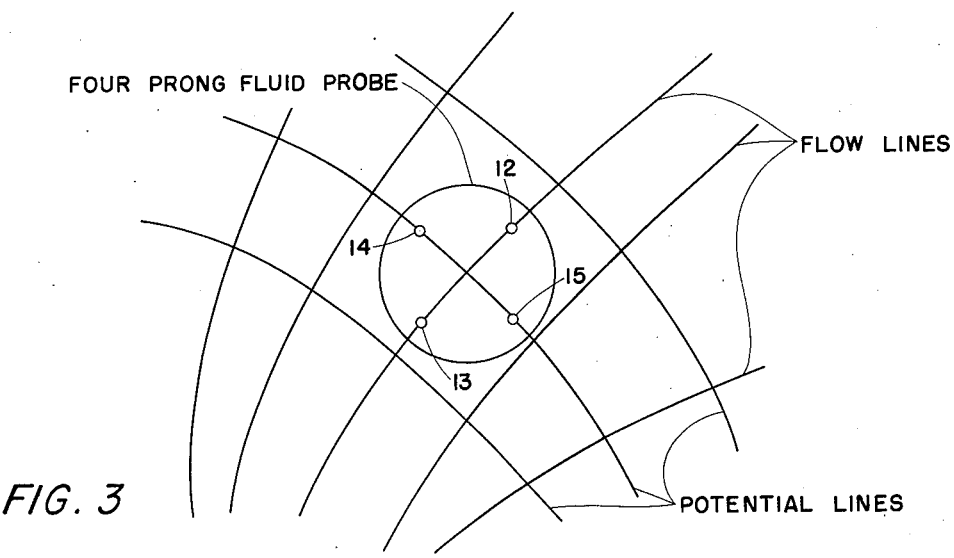
FIG. 3 is a diagram illustrating the spacial and operative relation of the exploring probe contacts employed.

Referring now to the drawings in detail, the apparatus includes a potentiometric model or electrical analogue 1 made of an electrical insulating material, such as wood, wax, or plastic, and contoured to resemble an underground fluid reservoir. The model contains a suitable electrotype, for example a copper sulphate solution, and a number of vertical electrodes 2 are positioned therein at points corresponding to the wells operative in the reservoir. For convenience, only three such electrodes have been shown and it will be understood that an electrode should be provided for each well.

Electric current is supplied to the electrodes from a suitable power source through an isolating transformer 3, the secondary of which connects to two supply lines 4. A number of selector switches, indicated at 5, are connected across these lines, with the movable contact member 6 of each connected through a fixed resistance 7, a variable resistance 8, and a jack 9 to one of the electrodes 2. Variable resistances 8 provide individual control of current through the electrodes, while fixed resistances 7 serve as means for ascertaining the current flow with a voltmeter 10 permanently connected thereto. Jacks 9 permit the insertion of additional meters in the circuits, if desired.

By adjustment of resistances 8, to determine current value, and properly relating the line connections of switches 5, to determine current direction, the desired current flow system analogous to fluid flow in the reservoir is established in the electrolyte. Those contacts of switches 5 connected to one side of the supply are marked "PROD" and the other line contacts are marked "INJ", respectively for indicating "production" and "injection" positions so that the proper directional flow pattern can readily be set up.

The measurements necessary to determine the flow lines in the model are made by use of a probe 11 having a first pair of prongs or contacts 12 and 13 and a second pair of contacts 14 and 15, arranged such that a line passing through one pair is normal to a line passing through the other pair. The probe is adapted to be rotated in the electrolyte about the axis of a vertical shaft 16 so as to place a pair of the prongs for example, prongs 14 and 15, on the same equipotential line, as shown in FIG. 3. When this occurs, contacts 12 and 13 are disposed on the same flow line, the probe dimensions being small compared to the size of the electrolyte pool. In the assembly illustrated in FIGURE 1, shaft 16 is aligned with prong 12, whereby such rotation is about prong 12.

The probe is supported for rotation in this manner and translation in any direction over the model reservoir by means of a cross-arm 17 of a plotting mechanism indicated generally at 18, probe shaft 16 extending through the arm near one end thereof. The plotting mechanism comprises a transfer housing 19 which mounts the cross-arm, for example by rollers, for longitudinal sliding movement and which, in turn, is slidable along a pair of guide rails 20 disposed at right angles to the cross-arm. Thus, any point within reach of such end of the cross-arm may easily be explored by the probe.

Mounted near the other end of the cross-arm is a plotting device 21 adapted to move over a plotting table 22 having a chart of the reservoir 23 supported thereon. A metal plate 24 is interposed between the table and chart for a purpose to be discussed below. The transfer housing carries a null-balancing motor 25 operative to turn a horizontal shaft 26 having worms 27 and 28 at the ends thereof respectively engaged with a pinion gear 29 on the probe shaft 16 and a pinion gear 30 of the plotting device, which is likewise rotatably supported by the cross-arm. Accordingly, the motor is operative to rotate the probe and plotting device in unison.

Figure 4:
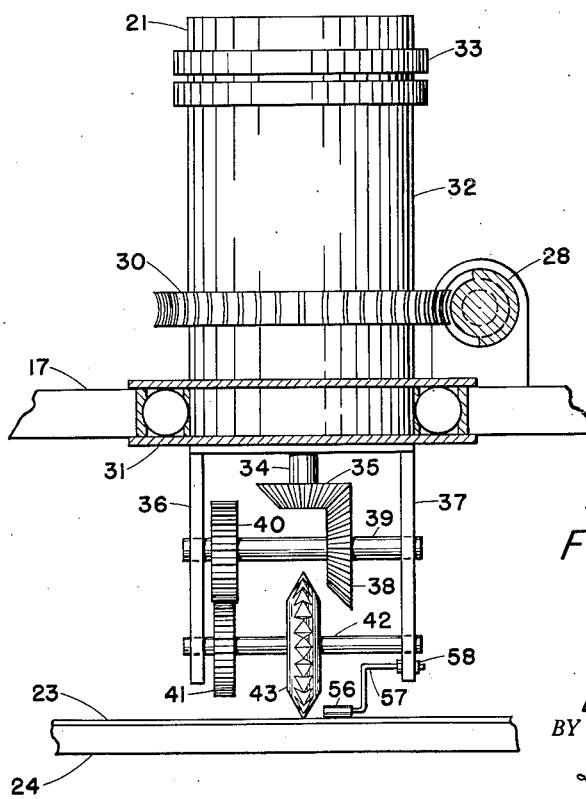
FIG. 4 is an elevational view, on an enlarged scale, of our new marking device.

With reference now to FIG. 4, the plotting device is supported for rotation about a vertical axis by a ball bearing assembly 31 carried by the cross-arm 17, so that it may thus be rotated under control of the balancing motor. The device includes a small motor 32 of constant r.p.m., which is energized from a power source by means of slip rings 33. The drive shaft 34 of this motor is vertically disposed and has a bevel gear 35 at its lower end centrally disposed between the two downwardly extending projections 36 and 37 of the body of the device. Gear 35 is meshed with a bevel gear 38 keyed to a shaft 39 rotatably supported by such extensions and carrying at one side a gear 40 in driving engagement with a gear 41 on a lower shaft 42. Rotation of shaft 42 drives a toothed wheel or gear 43 which is frictionally engaged with the chart 23.

This drive of gear 43 develops sufficient power to propel the entire plotting mechanism, thereby to translate the probe and plotting device to corresponding positions in the electrolyte and on the chart, respectively. The direction of the movement is regulated by rotation of the device, and consequent turning of the axis of gear 43, under control of the motor 25. Accordingly, by making the balancing motor 25 responsive to potential differences detected by the contacts 14 and 15, and disposing the axis of rotation of gear 43 parallel to the plane of such contacts, the mechanism will automatically follow a flow line in the model. By connecting the motor to contacts 12 and 13, the operation can be reversed and the mechanism caused to follow an equipotential line. The exploring probe has four slip rings 44, 45, 46 and 47 which connect, respectively, to prongs 12, 13, 14 and 15 and permit measurements to be made with the latter.

In our new plotting device, the gear 43 which serves to propel the mechanism also operates as the marking member. The chart 23 is made of electro-sensitive paper, such as Teledelos recording paper, which changes color when a small electric current passes therethrough. The gear is electrically grounded, as indicated at 53, and a small potential is applied to the metal plate 24 under the chart by a transformer 54 having a grounded resistance 55 in its secondary circuit. A spot will thereby be recorded each time a tooth of the gear touches the paper, this completing the circuit through ground, and the line to be recorded will be defined by a series of dots automatically marked on the chart.

The plotting device also carries a separate marking member or stylus in the form of a small roller 56 positioned by an arm 57 to engage the chart continuously closely adjacent the engagement of gear 43 therewith. The roller and arm are conductive and insulated from the gear by a bushing 58 in extension 37 which supports the arm, to prevent current flow from the plate through the roller to the ground of the gear. A separate grounding circuit 59, including a normally open push-button switch 60, is provided to permit current flow from the plate to the roller when it is desired to record a distinct mark on the chart with the same. The utilization of this separate marking means will be described in the following.

Figure 5:
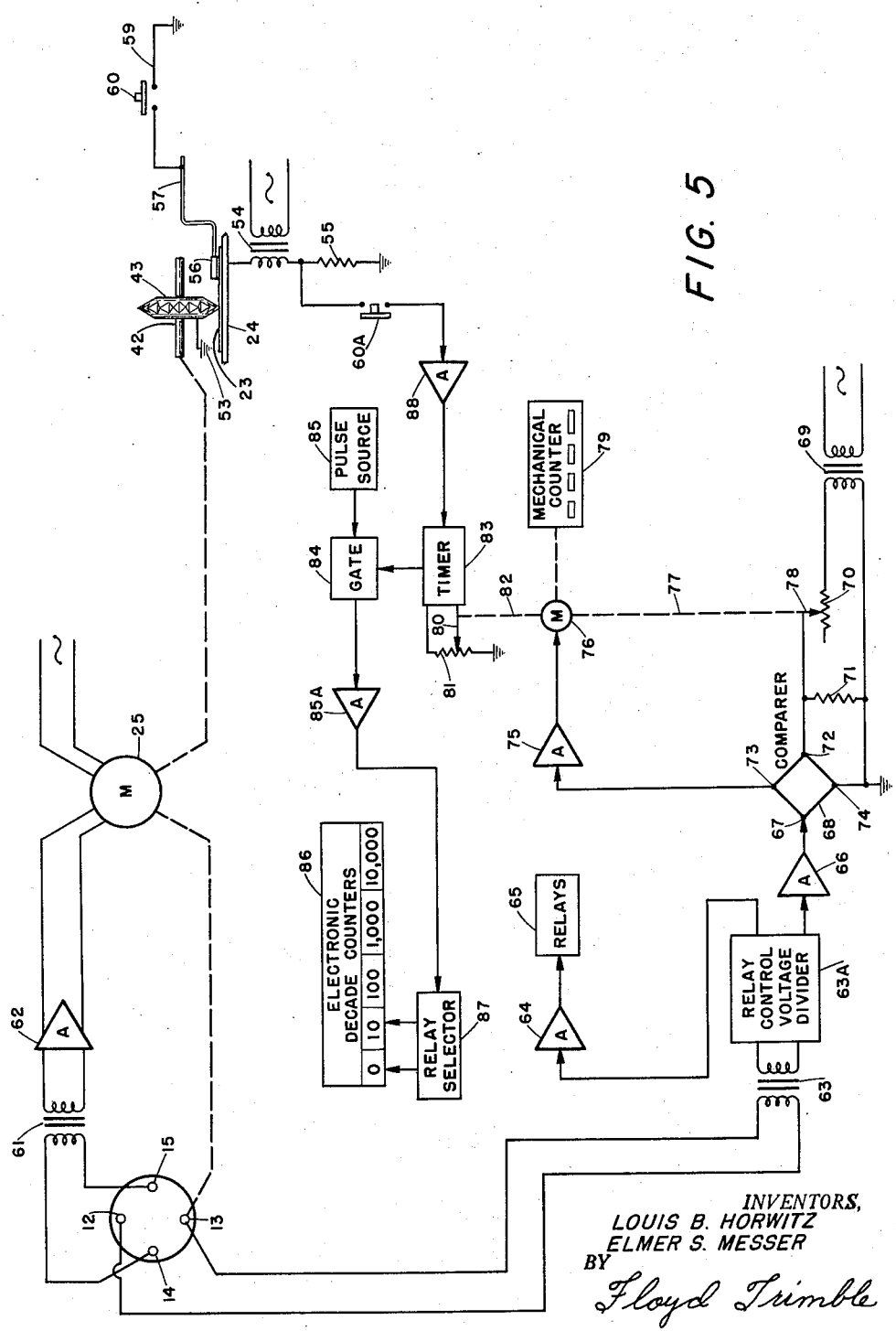
FIG. 5 is a schematic diagram of the complete circuit which affords automatic operation of the plotting mechanism.

The complete system and operation for plotting progress of fluid injected in the reservoir will now be considered with reference to FIG. 5. Since flow lines are to be mapped, the equipotential contacts 14 and 15 are connected, through a transformer 61 and amplifier 62, to the servomotor 25, so that rotation of the latter and hence steering of the plotting mechanism causes these contacts to seek points of equal potential in the electrolyte. The operator initially sets the probe near one of the electrodes 2 representative of an injection well and drive gear 43 propels the plotting mechanism automatically along the path of the current flow line normal to the successive equipotential lines detected by contacts 14 and 15. The corresponding fluid flow line is automatically marked on the chart 23 by gear 43 in the manner set forth earlier.

In order to record the transit time of the fluid flow along each line thus plotted, the same being proportional to the reciprocal of the voltage along the current line in the electrolyte, the system includes means for measuring potentials between contacts 12 and 13, which may be regarded in this operation as transit time contacts. Connected across these contacts is a transformer 63 having a relay-controlled voltage divider 63A in the secondary circuit thereof which permits automatic stepping down of the signal in increments as desired depending on the ranges of the recording instruments employed. Amplifier 64 and relays 65 control operation of the divider in response to the magnitude of the pick-up signal; and, in actual practice, two relays are provided, triggered by different signal values to cause the divider to reduce the signal supplied to the rest of the circuit in corresponding steps. As will appear, relays 65 also effect range switching of a transit time totalizer to provide proper multiplication of the signal recorded therein, compensating for stepdown in the divider.

The output signal from the divider is passed through an amplifier 66 and applied to one point 67 of a bridge circuit comparer 68. A standard voltage, derived from a circuit including a supply transformer 69, a series variable resistance 70, and a fixed shunt resistance 71, is applied to the point 72 of the comparer opposite the signal point 67. Any difference between the signal and standard voltages appears across the remaining opposite points 73 and 74 and, after being amplified in an amplifier 75, is applied to a servo-motor 76. This motor has a first drive connection, indicated by dashed line 77, with movable contact 78 of the variable resistance in the standard voltage circuit to form a balancing system in which movement of the contact by the motor compensates any detected difference between the compared voltages. This balancing movement is proportional to a change in the reciprocal of the potential across transit time contacts 12 and 13 of the probe, and a mechanical counter 79 driven by the motor is provided to indicate the thus measured incremental transit times in time units.

Balancing motor 76 also positions the arm 80 of a potentiometer 81 through a drive connection shown by the dashed line 82 so that such arm measures a voltage proportional to the incremental transit time. This voltage in turn controls a timer 83 which will, when actuated, open an electronic gate 84 for a period of time proportional to the voltage. Opening of the gate allows a regular stream of pulses from a source 85 to reach a series of electronic decade counters 86 of commercially available type, such for example as those supplied by the Berkeley Scientific Company, through an amplifier 85A and a scale selector 87. These counters read directly the number of pulses passing through the gate and, in each interval of timer actuation, a number of counts representative of transit time is registered. The counters are cumulative, so that a totalizing results. Selector 87 is controlled by relays 65 to shift the input of the counters to the proper scale for multiplication when the divider 63A is actuated to step-down the signal voltage.

The flow of current which records the flow line points on the chart is used to trigger the transit time totalizer so that the latter receives impulses of regular intervals. This is accomplished by a circuit including an amplifier 88, which applies the voltage developed across resistance 55 in the potential supply to the metal plate 24, to the timer 83. Since the increments are small, the operator depresses push-button 60 when the totalizer indicates the desired time increment total, thereby to energize stylus 56 and mark the interval alongside the flow line. Push button switch 60A, a portion of switch 60, blocks the resulting undesired impulse from the totalizing network. After one flow line has been automatically plotted and the points of predetermined cumulative transit times recorded, the operator sets the probe on a different flow line in the model, this operation being repeated until the desired number of lines have been mapped. By then connecting points of the same transit time intervals on the several lines, the invasion fronts of the injected fluid are determined.

It will accordingly be seen that we have provided a relatively quick, yet highly accurate, plotting mechanism which may be used not only for petroleum reservoir analysis, but also in recording field data analogous to other mechanical and electrical systems. The transit time totalizer described completely eliminates the carefully machained mechanisms used for similar purposes in prior systems and is especially adaptable to range switching. Such switching in mechanical systems is laborious and requires multiple entry for high ranges. Our automatic range switching enhances the accuracy of the readings by permitting the use of extended time scales, without presenting the possibility of operator error which is present in manual range switching. The overall accuracy is also improved by the very small increments of distance between the successive dots plotted. To duplicate this accuracy in manual operation would require an impractical amount of time and labor to be applied.

Those components of the system, such as the divider gate, and the like, not described in specific detail are individually conventional and the statements of their operative effect are sufficient to a complete understanding of the invention by workers skilled in the art. Modifications in the elements and assemblies specifically disclosed may be made within the scope of the invention, for example a driving wheel of continuous periphery, rather than one having teeth, could be used to propel the mechanism, the totalizer in such case being adapted continually to increase in value rather than in steps. Also, a preset marking indicator could be provided automatically to mark the map at desired intervals in lieu of the push-button operation set forth.

While the probe described is provided with four contacts, it is feasible to use only three contacts, rotation of the probe being about an imaginary point lying midway between the equipotential contacts. When the latter contacts are on the same equipotential line, this point will lie on the same flow line as the third contact, and since the probe dimensions are quite small as compared to the tank dimensions, measurements between the third contact and one of the equipotential contacts can be taken to determine transmit time units.

Other modes of applying the principle of the invention may be employed, change being made as regards the details described, provided the features stated in any of the following claims, or the equivalent of such, be employed.

We therefore particularly point out and distinctly claim as our invention:

1. An apparatus for plotting characteristics of a model potential field established in an electrically conductive body, an exploring probe having a pair of spaced electrical contacts adapted to engage said body, potential balancing means operative to rotate said contacts to equipotential points on said body, drive means for automatically propelling said probe over the body, and orienting means for steering such movement of the probe responsive to rotation of said contacts so that the probe is propelled along a line normal to the equipotential points detected thereby.

2. In apparatus for plotting characteristics of a model potential field established in an electrically conductive body, an exploring probe having a pair of spaced electrical contacts adapted to engage said body, potential balancing means operative to rotate said contacts to equipotential points on said body, drive means for automatically propelling said probe over the body, orienting means for steering such movement of the probe responsive to rotation of said contacts so that the probe is propelled along a line normal to the equipotential points detected thereby, and means for measuring potentials in said body between predetermined points on such line as the probe moves therealong.

3. In apparatus for plotting characteristics of a model potential field established in an electrically conductive body, an exploring probe having at least three electrical contacts arranged in spaced-apart out of line relation and adapted to engage said body, potential balancing means operative to rotate said contacts so that two of them are positioned on equipotential points of said body, means for measuring the potential between a pair of said contacts on a line extending transversely with respect to the line of such two contacts, drive means for automatically propelling said probe over the body, and orienting means for steering such movement of the probe responsive to rotation of said contacts so that the probe is propelled along a line normal to the equipotential points detected thereby.

4. In apparatus for plotting characteristics of a model potential field established in an electrically conductive body, an exploring probe having a pair of spaced electrical contacts adapted to engage said body, potential balancing means operative to rotate said contacts to equipotential points on said body, a chart supported adjacent said body for mapping of the field characteristics thereon, a plotting device adapted to move over said chart, drive means for automatically propelling said probe and plotting device together as a unit, and orienting means for steering such movement responsive to rotation of said probe so that the latter follows a line normal to the equipotential points detected by said contacts, the plotting device being caused to track a corresponding line on said chart.

5. In apparatus for plotting characteristics of a model potential field established in an electrically conductive body, an exploring probe having a pair of spaced electrical contacts adapted to engage said body, potential balancing means operative to rotate said contacts to equipotential points on said body, a chart supported adjacent said body for mapping of the field characteristics thereon, a plotting device adapted to move over said chart, drive means for automatically propelling said probe and plotting device together as a unit, orienting means for steering such movement responsive to rotation of said probe so that the latter follows a line normal to the equipotential points detected by said contacts, the plotting device being caused to track a corresponding line on said chart, and means for measuring potentials in said body between predetermined points on the line therein along which the probe is propelled.

6. In apparatus for plotting characteristics of a model potential field established in an electrically conductive body, a probe comprising two spaced electrical contacts adapted to engage said body, a chart supported adjacent the body for mapping of the field characteristics thereon, a plotting device including a rotary member frictionally engaged with said chart operative when driven to propel the device thereover, means mounting said probe for translation with said plotting device, means for automatically driving said rotary member thereby to move said probe and plotting device, and potential balancing means operative to rotate in unison the probe contacts and the axis of rotation of said rotary member in response to a difference in potential at the points on said body engaged by said contacts, thereby to steer the probe contacts to equipotential points on said body and correspondingly move said plotting device.

7. In apparatus for plotting characteristics of a model potential field established in an electrically conductive body, a probe comprising two spaced electrical contacts adapted to engage said body, a chart supported adjacent the body for mapping of the field characteristics thereon, a plotting device including a rotary member frictionally engaged with said chart operative when driven to propel the device thereover, means mounting said probe for translation with said plotting device, means for automatically driving said rotary member thereby to move said probe and plotting device, potential balancing means operative to rotate in unison the probe contacts and the axis of rotation of said rotary member in response to a difference in potential at the points on said body engaged by said contacts, thereby to steer the probe contacts to equipotential points on said body and correspondingly move said plotting device, and means for measuring potentials in said body between predetermined points on such line therein along which the probe is propelled.

8. In apparatus for plotting characteristics of a model potential field established in an electrically conductive body, a probe comprising two spaced electrical contacts adapted to engage said body, a chart supported adjacent the body for mapping of the field characteristics thereon, a plotting device including a rotary member frictionally engaged with said chart operative when driven to propel the device thereover, means mounting said probe for translation with said plotting device, means for automatically driving said rotary member thereby to move said probe and plotting device, potential balancing means operative to rotate in unison the probe contacts and the axis of rotation of said rotary member in response to a difference in potential at the points on said body engaged by said contacts, thereby to steer the probe contacts to equipotential points on said body and correspondingly move said plotting device, and means for marking said chart with said rotary member to plot the movement thereof.

9. In apparatus for plotting characteristics of a model potential field established in an electrically conductive body, a probe comprising two spaced electrical contacts adapted to engage said body, a chart of electro-sensitive material supported adjacent the body for mapping of the field characteristics thereon, a plotting device including a rotary member frictionally engaged with said chart operative when driven to propel the device thereover, means mounting said probe for translation with said plotting device, means for automatically driving said rotary member thereby to move said probe and plotting device, potential balancing means operative to rotate in unison the probe contacts and the axis of rotation of said rotary member in response to a difference in potential at the points on said body engaged by said contacts, thereby to steer the probe contacts to equipotential points on said body and correspondingly move said plotting device, and means for passing electric current through said rotary member and chart to mark the latter.

10. In apparatus for plotting progress of an injection fluid traversing a porous fluid reservoir, including a conductive body in which electric currents are caused to flow simulative of the flow of such injection fluid; an electro-sensitive chart of the reservoir supported adjacent said conductive body, self-propelled plotting mechanism including a rotary member frictionally engaged with said chart and rotatable contacts engaged with said body, the axis of said rotary member being related to the plane of said contacts to have the same relationship to the chart that such plane has to the conductive body, potential balancing means operative to rotate said contacts to equipotential points on said body and correspondingly to rotate the axis of said rotary member, thereby to steer the plotting mechanism with the probe following a current flow line in the body and the rotary member the analogous fluid flow line in the reservoir, and means for passing electric current through said rotary member and chart to record the movement of the member on the chart and thus plot such fluid flow line.

11. In apparatus for plotting progress of an injection fluid traversing a porous fluid reservoir, including a conductive body in which electric currents are caused to flow simulative of the flow of such injection fluid; an electro-sensitive chart of the reservoir supported adjacent said conductive body, self-propelled plotting mechanism including a rotary member frictionally engaged with said chart and rotatable contacts engaged with said body, the axis of said rotary member being related to the plane of said contacts to have the same relationship to the chart that such plane has to the conductive body, potential balancing means operative to rotate said contacts to equipotential points on said body and correspondingly to rotate the axis of said rotary member, thereby to steer the plotting mechanism with the probe following a current flow line in the body and the rotary member the analogous fluid flow line in the reservoir, means for passing electric current through said rotary member and chart to record the movement of the member on the chart and thus plot such fluid flow line, and means for measuring the reciprocal of the potential gradient along such current flow line in the body.

12. In apparatus for plotting progress of an injection fluid traversing a porous fluid reservoir, including a conductive body in which electric currents are caused to flow simulative of the flow of such injection fluid; an electrosensitive chart of the reservoir supported adjacent said conductive body, self-propelled plotting mechanism including a rotary member frictionally engaged with said chart and rotatable contacts engaged with said body, the axis of said rotary member being related to the plane of said contacts to have the same relationship to the chart that such plane has to the conductive body, potential balancing means operative to rotate said contacts to equipotential points on said body and correspondingly to rotate the axis of said rotary member, thereby to steer the plotting mechanism with the probe following a current flow line in the body and the rotary member the analogous fluid flow line in the reservoir, means for passing electric current through said rotary member and chart to record the movement of the member on the chart and thus plot such fluid flow line, means for measuring the reciprocal of the potential gradient between successive points on such current flow line and indicating the same in time-scale units to represent incremental transit times of fluid flow in the reservoir, and means for adding such reciprocals to determine total transit time.

13. In apparatus for plotting progress of an injection fluid traversing a porous fluid reservoir, including a conductive body in which electric currents are caused to flow simulative of the flow of such injection fluid; an electrosensitive chart of the reservoir supported adjacent said conductive body, self-propelled plotting mechanism including a rotary member frictionally engaged with said chart and rotatable contacts engaged with said body, the axis of said rotary member being related to the plane of said contacts to have the same relationship to the chart that such plane has to the conductive body, potential balancing means operative to rotate said contacts to equipotential points on said body and correspondingly to rotate the axis of said rotary member, thereby to steer the plotting mechanism with the probe following a current flow line in the body and the rotary member the analogous fluid flow line in the reservoir, means for passing electric current through said rotary member and chart to record the movement of the member on the chart and thus plot such fluid flow line, means for measuring the reciprocal of the potential gradient between successive points on such current flow line and indicating the same in time-scale units to represent incremental transit times of fluid flow in the reservoir, means for adding such reciprocals to determine total transit time, and means actuatable to produce a distinctive mark on said chart alongside the plot made by said rotary member so that the occurrence of desired total transit times may be recorded thereon.

14. An apparatus for plotting characteristics of a model potential field established in an electrically conductive body comprising a rotatably mounted exploring probe having two spaced electrical contacts adapted to engage said body, a chart supported adjacent said body for mapping field characteristics of said electrically conductive body, a rotatably mounted plotting device, rotatable mounting means for said probe interconnected with said plotting device whereby said probe and said plotting device rotate in unison, potential balancing means operative to rotate said probe and said plotting device in response to a difference in potential at the points on said body engaged by said rotatably mounted probe, said rotatably mounted plotting device having a rotatably mounted wheel member frictionally engaged with said chart, said wheel being rotatable in a plane at right angles to the plane of rotation of said plotting device, propelling means operatively connected to said wheel whereby the plotting device is caused to track a line on said chart corresponding to a line normal to the line of equipotential points in said body detected by said probe.

References Cited in the file of this patent

UNITED STATES PATENTS

| | | |
|---|---|---|
| 1,293,747 | Ford | Feb. 11, 1919 |
| 2,569,816 | Lee | Oct. 2, 1951 |
| 2,569,817 | Wolf et al. | Oct. 2, 1951 |
| 2,586,686 | Medlock | Feb. 19, 1952 |
| 2,639,209 | Gamarekian | May 19, 1953 |
| 2,700,750 | Dickinson | Jan. 25, 1955 |
| 2,839,246 | Andrews | June 17, 1958 |
| 2,858,978 | Yetter | Nov. 4, 1958 |

OTHER REFERENCES

"Automatic Electron Trajectory Plotting Using the Electrolytic Tank Analogue" (Baker), British Journal of Applied Physics, vol. 5, May 1954; page 194 relied on.

UNITED STATES PATENT OFFICE

CERTIFICATE OF CORRECTION

Patent No. 3,038,656  June 12, 1962

Louis B. Horwitz et al.

It is hereby certified that error appears in the above numbered patent requiring correction and that the said Letters Patent should read as corrected below.

Column 1, line 34, for "models" read -- model --; column 3, line 7, for "electrotype" read -- electrolyte --; column 6, line 45, for "An" read -- In --.

Signed and sealed this 13th day of November 1962.

(SEAL)
Attest:

ERNEST W. SWIDER
Attesting Officer

DAVID L. LADD
Commissioner of Patents